(12) United States Patent
Zhao et al.

(10) Patent No.: US 12,445,227 B2
(45) Date of Patent: Oct. 14, 2025

(54) METHOD PERFORMED BY USER EQUIPMENT, AND USER EQUIPMENT (71) Applicant: Sharp Kabushiki Kaisha, Sakai (JP)

(72) Inventors: Yinan Zhao, Shanghai (CN); Chao Luo, Shanghai (CN); Renmao Liu, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 459 days.

(21) Appl. No.: 17/917,061

(22) PCT Filed: Apr. 8, 2021

(86) PCT No.: PCT/CN2021/085917
§ 371 (c)(1),
(2) Date: Oct. 5, 2022

(87) PCT Pub. No.: WO2021/204191
PCT Pub. Date: Oct. 14, 2021

(65) Prior Publication Data
US 2023/0189301 A1   Jun. 15, 2023

(30) Foreign Application Priority Data

Apr. 9, 2020   (CN) .......................... 202010276901.9

(51) Int. Cl.
*H04L 1/1607*   (2023.01)
*H04L 1/1812*   (2023.01)
(Continued)

(52) U.S. Cl.
CPC .......... *H04L 1/1607* (2013.01); *H04L 1/1812* (2013.01); *H04L 27/2605* (2013.01); *H04W 72/40* (2023.01)

(58) Field of Classification Search
CPC . H04L 1/1607; H04L 1/1812; H04L 27/2605; H04L 1/0041; H04L 1/1861;
(Continued)

(56) References Cited

U.S. PATENT DOCUMENTS

2019/0373587 A1* 12/2019 Chang ..................... H04L 67/12
2020/0029318 A1    1/2020 Guo
(Continued)

FOREIGN PATENT DOCUMENTS

CN         110945923 A      3/2020

OTHER PUBLICATIONS

Huawei et al., "Remaining details of sidelink physical layer structure", 3GPP TSG RAN WG1 Meeting #100-e, R1-2000181, Feb. 24-Mar. 6, 2020, 25 pages.
(Continued)

*Primary Examiner* — Noel R Beharry
*Assistant Examiner* — Wilfred Thomas
(74) *Attorney, Agent, or Firm* — Keating & Bennett, LLP (57) ABSTRACT Provided in the present invention are a method performed by user equipment and user equipment. The method comprises: determining sidelink resource pool configuration information; receiving a PSCCH and a corresponding PSSCH transmitted by another user equipment; and determining an initialization sequence parameter $c_{init}$ of a cyclic shift $\alpha_1$ of a sequence for a physical sidelink feedback channel (PSFCH).

2 Claims, 3 Drawing Sheets

(51) Int. Cl.
*H04L 27/26* (2006.01)
*H04W 72/40* (2023.01)

(58) Field of Classification Search
CPC ... H04L 5/0055; H04L 1/0061; H04L 5/0012; H04L 5/0091; H04L 67/12; H04L 5/0053; H04W 72/40; H04W 72/25; H04W 4/70
See application file for complete search history.

(56) References Cited

U.S. PATENT DOCUMENTS

| | | | | |
|---|---|---|---|---|
| 2020/0288286 | A1* | 9/2020 | Hwang | H04L 27/2607 |
| 2021/0297192 | A1* | 9/2021 | Miao | H04L 1/1671 |
| 2022/0085923 | A1* | 3/2022 | Ye | H04W 72/02 |
| 2022/0394560 | A1* | 12/2022 | Yu | H04W 72/0446 |
| 2023/0069228 | A1* | 3/2023 | Yoshioka | H04L 1/1864 |
| 2023/0136864 | A1* | 5/2023 | Lei | H04L 5/0055 |
| | | | | 370/329 |
| 2023/0246744 | A1* | 8/2023 | Yoshioka | H04L 1/1671 |
| | | | | 370/328 |

OTHER PUBLICATIONS

Official Communication issued in International Patent Application No. PCT/CN2021/085917, mailed on Jul. 14, 2021.

Qualcomm Incorporated, "Work item proposal on LTE Device to Device Proximity Services", 3GPP TSG RAN Meeting #63, RP-140518, Mar. 3-6, 2014, 7 pages.

Qualcomm Incorporated, "Work Item Proposal for Enhanced LTE Device to Device Proximity Services", 3GPP TSG RAN Meeting #66, RP-142311, Dec. 8-11, 2014, 8 pages.

LG Electronics et al., "New WI proposal: Support for V2V services based on LTE sidelink", 3GPP TSG RAN Meeting #70, RP-152293, Dec. 7-10, 2015, 8 pages.

Huawei et al., "New WID on 3GPP V2X Phase 2", 3GPP TSG RAN Meeting #75, RP-170798, Mar. 6-9, 2017, 5 pages.

Vodafone, "New SID: Study on NR V2X", 3GPP TSG RAN Meeting #80, RP-181429, Jun. 11-14, 2018, 5 pages.

MCC Support, "Final Report of 3GPP TSG RAN WG1 #95 v1.0.0", 3GPP TSG-RAN WG1 Meeting #96, R1-1901482, Feb. 25-Mar. 1, 2019, pp. 1-172.

MCC Support, "Final Report of 3GPP TSG RAN WG1 #97 v1.0.0", 3GPP TSG-RAN WG1 Meeting #98, R1-1907973, Aug. 26-30, 2019, pp. 1-163.

Qualcomm Incorporated, "Physical Layer Procedures for Sidelink", 3GPP TSG RAN WG1 #100-e, R1-2000966, Feb. 24-Mar. 6, 2020, 9 pages.

Ericsson, "Physical layer structure for NR sidelink", 3GPP TSG-RAN WG1 Meeting #100-e, R1-2001007, Feb. 24-Mar. 6, 2020, pp. 1-9.

TCL Communication, "Physical Layer Procedures for Sidelink", 3GPP TSG RAN WG1 Meeting #100-e, R1-2000431, Feb. 24-Mar. 6, 2020, 7 pages.

* cited by examiner

METHOD PERFORMED BY USER EQUIPMENT, AND USER EQUIPMENT

TECHNICAL FIELD

The present disclosure relates to the technical field of wireless communications, and in particular to a method performed by user equipment, a method performed by a base station, and corresponding user equipment.

BACKGROUND

In conventional cellular networks, all communication needs to be forwarded via base stations. By contrast, D2D communication (device-to-device communication) refers to a technique in which two user equipment units directly communicate with each other without needing a base station or a core network to perform forwarding therebetween. A research project on the use of LTE equipment to implement proximity D2D communication services was approved at the 3rd Generation Partnership Project (3GPP) RAN #63 plenary meeting in March 2014 (see Non-Patent Document 1). Functions introduced in the LTE Release 12 D2D include:
1) a discovery function between proximate devices in an LTE network coverage scenario;
2) a direct broadcast communication function between proximate devices; and
3) support for unicast and groupcast communication functions at higher layers.

A research project on enhanced LTE eD2D (enhanced D2D) was approved at the 3GPP RAN #66 plenary meeting in December 2014 (see Non-Patent Document 2). Main functions introduced in the LTE Release 13 eD2D include:
1) a D2D discovery in out-of-coverage and partial-coverage scenarios; and
2) a priority handling mechanism for D2D communication.

Based on the design of the D2D communication mechanism, a V2X feasibility research project based on D2D communication was approved at the 3GPP RAN #68 plenary meeting in June 2015. V2X stands for Vehicle to Everything, and is used to implement information exchange between a vehicle and all entities that may affect the vehicle, for the purpose of reducing accidents, alleviating traffic congestion, reducing environmental pollution, and providing other information services. Application scenarios of V2X mainly include four aspects:
1) V2V, Vehicle to Vehicle, i.e., vehicle-to-vehicle communication;
2) V2P, Vehicle to Pedestrian, i.e., a vehicle transmits alarms to a pedestrian or a non-motorized vehicle;
3) V2N: Vehicle-to-Network, i.e., a vehicle connects to a mobile network;
4) V2I: Vehicle-to-Infrastructure, i.e., a vehicle communicates with road infrastructure.

3GPP divides the research and standardization of V2X into three stages. The first stage was completed in September 2016, and mainly focused on V2V and was based on LTE Release 12 and Release 13 D2D (also known as sidelink communication), that is, the development of proximity communication technologies (see Non-Patent Document 3). V2X stage 1 introduced a new D2D communication interface referred to as PC5 interface. The PC5 interface is mainly used to address the issue of cellular Internet of Vehicle (IoV) communication in high-speed (up to 250 km/h) and high-node density environments. Vehicles can exchange information such as position, speed, and direction through the PC5 interface, that is, the vehicles can communicate directly through the PC5 interface. Compared with the proximity communication between D2D devices, functions introduced in LTE Release 14 V2X mainly include:
1) higher density DMRS to support high-speed scenarios;
2) introduction of subchannels to enhance resource allocation methods; and
3) introduction of a user equipment sensing mechanism with semi-persistent scheduling.

The second stage of the V2X research project belonged to the LTE Release 15 research category (see Non-Patent Document 4). Main features introduced included high-order 64QAM modulation, V2X carrier aggregation, short TTI transmission, as well as feasibility study of transmit diversity.

The corresponding third stage, V2X feasibility research project based on 5G NR network technologies (see Non-Patent Document 5), was approved at the 3GPP RAN #80 plenary meeting in June 2018.

At the 3GPP RAN1 #95bis meeting in November 2018, the following meeting conclusions were reached regarding HARQ feedback in sidelink communication:
A physical sidelink feedback channel (PSFCH) was defined to transmit unicast and groupcast ACK and NACK feedback in sidelink communication.

At the 3GPP RAN1 #97bis meeting in May 2019, the following meeting conclusions were reached regarding design of the PSFCH in sidelink communication:
A PSFCH supporting a single symbol and designed on the basis of a sequence.
PUCCH format 0 in NR is used as a design basis;
This PSFCH format (design) is applicable to unicast HARQ feedback and groupcast HARQ feedback (including mechanism 1 and mechanism 2) in sidelink communication.

A method for determining a sequence generated for a PSFCH designed on the basis of the sequence is included in the solution of the present patent.

PRIOR ART DOCUMENT

Non-Patent Documents

Non-Patent Document 1: RP-140518, Work item proposal on LTE Device to Device Proximity Services
Non-Patent Document 2: RP-142311, Work Item Proposal for Enhanced LTE Device to Device Proximity Services
Non-Patent Document 3: RP-152293, New WI proposal: Support for V2V services based on LTE sidelink
Non-Patent Document 4: RP-170798, New WID on 3GPP V2X Phase 2
Non-Patent Document 5: RP-181480, New SID Proposal: Study on NR V2X
Non-Patent Document 6: RAN1 #95, Chairman notes, section 7.2.4.2
Non-Patent Document 7: RAN1 #97, Chairman notes, section 7.2.4.5

SUMMARY

In order to address at least a part of the aforementioned issues, the present disclosure provides a method performed by user equipment and user equipment, which are effectively applicable to application scenarios of V2X based on 5G NR network technology.

A method performed by user equipment according to a first aspect of the present invention comprises: transmitting a physical sidelink feedback channel (PSFCH); and generating a cyclic shift $\alpha_1$ of a sequence for the PSFCH.

In the method performed by user equipment according to the first aspect of the present invention, the PSFCH is used to carry sidelink hybrid automatic repeat request (HARQ) feedback information.

In the method performed by user equipment according to the first aspect of the present invention, the cyclic shift $\alpha_1$ is determined according to a parameter $c_{init}$, wherein if a PSFCH frequency hopping identity is configured, then the parameter $c_{init}$ is equal to the value of the PSFCH frequency hopping identity; otherwise, the parameter $c_{init}$ is equal to 0.

User equipment according to a second aspect of the present invention comprises: a processor; and a memory storing instructions, wherein the instructions, when run by the processor, perform the method according to the first aspect.

BRIEF DESCRIPTION OF THE DRAWINGS

The above and other features of the present disclosure will become more apparent with the following detailed description in conjunction with the accompanying drawings.

DETAILED DESCRIPTION

The following describes the present disclosure in detail with reference to the accompanying drawings and specific embodiments. It should be noted that the present disclosure should not be limited to the specific embodiments described below. In addition, for simplicity, detailed description of the prior art not directly related to the present disclosure is omitted to prevent confusion in understanding the present disclosure.

A plurality of embodiments according to the present disclosure are described in detail below by using a 5G mobile communication system and its subsequent evolved versions as an exemplary application environment. However, it is to be noted that the present invention is not limited to the following embodiments, and rather, it is applicable to many other wireless communication systems, such as a communication system later than 5G and a 4G mobile communication system earlier than the 5G.

Some terms related to the present disclosure are described below. Unless otherwise specified, the terms related to the present disclosure use the definitions herein. The terms given in the present disclosure may be named differently in LTE, LTE-Advanced, LTE-Advanced Pro, NR, and later communication systems, but unified terms are used in the present disclosure. When applied to a specific system, the terms may be replaced with terms used in the corresponding system.

3GPP: 3rd Generation Partnership Project
LTE: Long Term Evolution
NR: New Radio
PDCCH: Physical Downlink Control Channel
DCI: Downlink Control Information
PDSCH: Physical Downlink Shared Channel
UE: User Equipment
eNB: evolved NodeB, evolved base station
gNB: NR base station
TTI: Transmission Time Interval
OFDM: Orthogonal Frequency Division Multiplexing
C-RNTI: Cell Radio Network Temporary Identifier
CSI: Channel State Indicator
HARQ: Hybrid Automatic Repeat Request
CSI-RS: CSI-Reference Signal, channel state measurement reference signal
CRS: Cell Reference Signal
PUCCH: Physical Uplink Control Channel
PUSCH: Physical Uplink Shared Channel
UL-SCH: Uplink Shared Channel
CG: Configured Grant
Sidelink: Sidelink communication
SCI: Sidelink Control Information
PSCCH: Physical Sidelink Control Channel
MCS: Modulation and Coding Scheme
CRB: Common Resource Block
CP: Cyclic Prefix
PRB: Physical Resource Block
PSSCH: Physical Sidelink Shared Channel
FDM: Frequency Division Multiplexing
RRC: Radio Resource Control
RSRP: Reference Signal Receiving Power
SRS: Sounding Reference Signal
DMRS: Demodulation Reference Signal
CRC: Cyclic Redundancy Check
PSDCH: Physical Sidelink Discovery Channel
PSBCH: Physical Sidelink Broadcast Channel
SFI: Slot Format Indication
TDD: Time Division Duplexing
FDD: Frequency Division Duplexing
SIB1: System Information Block Type 1
SLSS: Sidelink Synchronization Signal
PSSS: Primary Sidelink Synchronization Signal
SSSS: Secondary Sidelink Synchronization Signal
PCI: Physical Cell ID
PSS: Primary Synchronization Signal
SSS: Secondary Synchronization Signal
BWP: Bandwidth Part
GNSS: Global Navigation Satellite System
SFN: System Frame Number (radio frame number)
DFN: Direct Frame Number
IE: Information Element
SSB: Synchronization Signal Block
EN-DC: EUTRA-NR Dual Connection
MCG: Master Cell Group
SCG: Secondary Cell Group
PCell: Primary Cell
SCell: Secondary Cell
PSFCH: Physical Sidelink Feedback Channel
AGC: Automatic Gain Control The following is a description of the prior art associated with the solutions of the present disclosure. Unless otherwise specified, the same terms in the specific embodiments have the same meanings as in the prior art.

It is worth pointing out that the V2X and sidelink mentioned in the description of the present disclosure have the same meaning. The V2X herein can also mean sidelink; similarly, the sidelink herein can also mean V2X, and no specific distinction and limitation will be made in the following text.

The resource allocation mode of V2X (sidelink) communication and the transmission mode of V2X (sidelink) communication in the description of the present disclosure can be replaced equivalently with each other.

The description of the present disclosure relates to a sequence-based PSFCH. It is worth pointing out that the design of the PSFCH includes sequence-based design, but is not limited thereto.

The PSCCH in the description of the present invention is used to carry SCI. The PSSCH associated with or relevant to or corresponding to or scheduled by PSCCH involved in the description of the present invention has the same meaning, and all refer to an associated PSSCH or a corresponding PSSCH. Similarly, the SCI (including first stage SCI and second stage SCI) associated with or relevant to or corresponding to PSSCH involved in the description has the same meaning, and all refer to associated SCI or corresponding SCI. It is worth pointing out that the first stage SCI, referred to as 1st stage SCI or SCI format 0-1, is transmitted in the PSCCH; and the second stage SCI, referred to as 2nd stage SCI or SCI format 0-2, is transmitted in resources of the corresponding PSSCH. SCI involved in the description of the present invention refers to first stage SCI or second stage SCI, or refers to first stage SCI and second stage SCI.

"Function value regarding parameter A and/or parameter B" involved in the description of the present invention indicates that a function may include only an input parameter A, or may include only an input parameter B, or may include the input parameter A and the input parameter B, for example, a function f(A, B)=3A+4B. When A=20 and B=10, the "function value regarding parameter A and/or parameter B" is equal to 100. When A=10 and B=20, the "function value regarding parameter A and/or parameter B" is equal to 110. It is worth pointing out that the present invention does not impose any limitation on specific implementation of the function f(A, and/or B).

A mod B involved in the description of the present invention refers to a remainder obtained after A is divided by B. For example, 7 mod 4 is equal to 3, and 2 mod 4 is equal to 2.

Sidelink Communication Scenario
1) Out-of-coverage sidelink communication: Both of two UEs performing sidelink communication are out of network coverage (for example, the UE cannot detect any cell that meets a "cell selection criterion" on a frequency at which sidelink communication needs to be performed, and that means the UE is out of network coverage).
2) In-coverage sidelink communication: Both of two UEs performing sidelink communication are in network coverage (for example, the UE detects at least one cell that meets a "cell selection criterion" on a frequency at which sidelink communication needs to be performed, and that means the UE is in network coverage).
3) Partial-coverage sidelink communication: One of two UEs performing sidelink communication is out of network coverage, and the other is in network coverage.

From the perspective of a UE side, the UE has only two scenarios, out-of-coverage and in-coverage. Partial-coverage is described from the perspective of sidelink communication.

NR V2X Unicast, Groupcast, and Broadcast

Existing LTE V2X communication only supports broadcast communication at a physical layer. Broadcast communication is widely applied in scenarios such as cellular communication where a base station transmits a system message to UE in a cell. The design goals of NR V2X include support for unicast communication and groupcast communication at a physical layer. Unicast communication refers to communication between transmitting user equipment (UE) and single receiving user equipment. Groupcast communication generally means that a group of UEs are assigned the same identity (ID), and a UE transmits V2X data to other UEs in the group, and receives V2X data transmitted by others UE in the group.

HARQ and Sidelink HARQ

In order to better improve the reliability of transmission and improve the spectrum efficiency, an HARQ retransmission mechanism is usually included in unicast communication and groupcast communication. HARQ stands for hybrid automatic repeat request, which can provide an error correction function and implement fast retransmissions, and is widely applied in wireless data communications. HARQ feedback includes HARQ ACK (this feedback information means that reception and decoding are correct) and HARQ NACK (this feedback information means that reception and decoding are not correct). Among them, HARQ ACK means that a receiving UE correctly receives and decodes data of a transmitting UE and therefore feeds back HARQ ACK; HARQ NACK means that the receiving UE does not correctly receive and decode the data of the transmitting UE. When the receiving UE feeds back HARQ NACK, the transmitting UE may retransmit corresponding data to ensure improvement in the reliability of data communication.

In NR V2X, HARQ feedback (or referred to as HARQ-ACK) and HARQ combining at a physical layer are supported. HARQ ACK and HARQ NACK therein are carried by a physical sidelink feedback channel (PSFCH).

Sidelink Groupcast HARQ

For groupcast sidelink communication, when HARQ feedback is enabled, two HARQ feedback mechanisms are supported, and are as follows:
1) (referred to as mechanism 1) the receiving UE only feeds back HARQ NACK; if the receiving UE decodes a PSCCH correctly but fails to decode a corresponding PSSCH correctly, then the receiving UE feeds back NACK; otherwise, the receiving UE does not perform HARQ feedback;
    a) All receiving UEs in a group share one PSFCH resource used to feed back HARQ NACK.
2) (referred to as mechanism 2) the receiving UE feeds back HARQ ACK and HARQ NACK; if the receiving UE decodes a PSCCH correctly but fails to decode a corresponding PSSCH correctly, then the receiving UE feeds back NACK; if the receiving UE decodes the PSCCH correctly and decodes the corresponding PSSCH correctly, then the receiving UE feeds back ACK.
    a) Each UE in the group uses a separate PSFCH resource to feed back HARQ ACK and HARQ NACK.

A PSFCH resource represents a PSFCH resource mapped to a specific time domain, a specific frequency domain, and a specific code domain.

PSFCH Resource Configuration

In a resource pool, PSFCHs are periodically configured in slots of the resource pool, and the period can be denoted as N, where the value of N may be 1, or 2, or 4. For example, N=1 means that each of the slots configured in the resource pool includes a PSFCH resource. N=2 means that every two consecutive slots of all of the slots configured in the resource pool include a slot including a PSFCH resource. N=4 means that every four consecutive slots of all of the slots configured in the resource pool include a slot including a PSFCH resource.

Sequence-based PSFCH

Here, $N_{PRB}^{PSFCH}$ is used to represent the number of PRBs (in Rel-16 NR sidelink communication, $N_{PRB}^{PSFCH}=1$) occupied by the PSFCH in the frequency domain, and a sequence length of the PSFCH is therefore denoted as $N_{PRB}^{PSFCH} \times N_{SC}^{RB}$, where $N_{SC}^{RB}=12$. This sequence can be denoted as $r^\alpha(n)=e^{j\alpha n} \times r(n)$, where $n=0, 1, 2, \ldots, N_{PRB}^{PSFCH} \times N_{SC}^{RB}-1$. $\alpha$ represents the cyclic shift of the sequence. Different cyclic shifts may generate different sequences (having the same sequence length), that is, different cyclic shifts represent different PSFCH resources. Specifically, if respective time domain resources and frequency domain resources of two PSFCHs are the same, and if respective cyclic shifts a of the PSFCHs are different (code domain resources are different), then the two PSFCHs represent two different PSFCH resources. On a certain designated (or determined) time-frequency resource, when an initial sequence is designated (or determined) to be an initial sequence r(n), the number of possible values of $\alpha$ is $N_{PRB}^{PSFCH} \times N_{SC}^{RB}$. That is, $r^\alpha(n)$ may generate $N_{PRB}^{PSFCH} \times N_{SC}^{RB}$ sequences at most. That is, $N_{PRB}^{PSFCH} \times N_{SC}^{RB}$ different PSFCH resources at most (in Rel-16 NR sidelink communication, the number of PSFCH resources is 12, i.e., 12 different sequences) exist on the designated (or determined) time-frequency resource.

For example, $N_{PRB}^{PSFCH}=1$, and the length of the sequence is $N_{PRB}^{PSFCH} \times N_{SC}^{RB}=12$. Therefore, when a certain time-frequency resource is designated, the number of possible values of a is $N_{PRB}^{PSFCH} \times N_{SC}^{RB}=12$, that is, 12 different PSFCH resources exist. If the UE needs to feed back 1-bit HARQ feedback information, then the UE needs to occupy two different PSFCH resources to respectively transmit the HARQ ACK and the HARQ NACK. At most 12/2=6 different UEs can be multiplexed on the designated time-frequency resource for HARQ feedback (each UE feeds back 1-bit HARQ information).

For HARQ-ACK in unicast sidelink communication and in mechanisms 1 and 2 of groupcast sidelink communication, when each UE provides feedback via a PSFCH, one sequence needs to correspond to NACK while another sequence corresponds to ACK. Therefore, the concept of a cyclic shift pair is introduced to sidelink communication. One cyclic shift pair (or a cyclic shift pair corresponding to a cyclic shift pair index) includes two different cyclic shifts. In the description of the present invention, $N_{CS}^{PSFCH}$ is used to represent the number of cyclic shift pairs, and the range of the cyclic shift pair index is from 0 to $N_{CS}^{PSFCH}-1$.

Method for determining cyclic shift $\alpha$

In the description of the present invention, the cyclic shift $\alpha$ may also be represented by $\alpha_1$, that is, $\alpha$ and $\alpha_1$ can equivalently replace each other. The method for determining $\alpha$ includes, but is not limited to, the following:

$$\alpha(\alpha_l) = \frac{2\pi}{N_{sc}^{RB}}\left((m_0 + m_{cs} + m_{int} + n_{cs}(n_{s,f}^\mu, l+l'))\mod N_{sc}^{RB}\right)$$

where $N_{SC}^{RB}=12$;

$m_0$ represents an initial cyclic shift;

$m_{int}=0$ (for generation of a PSFCH sequence in the present invention, $m_{int}=0$);

l represents an OFDM symbol index used in PSFCH transmission; since only the PSFCH format with one symbol is supported at present, it can be considered that l=0;

l' represents the index of the first OFDM symbol in the slot in PSFCH transmission, and represents the index of the OFDM symbol in the slot in PSFCH transmission at present;

the specific definition of function $n_{cs}(n_{s,f}^\mu, l)$ is:
$n_{cs}(n_{s,f}^\mu, l)=\Sigma_{m=0}^{72^m} \cdot c(8N_{symb}^{slot} n_{s,f}^\mu + 8l+m)$. A method for determining a sequence c(n) is as follows:

$c(n)=(x_1(n+N_c)+x_2(n+N_c))\mod 2$ $x_1(n+31)=(x_1(n+3)+x_1(n))\mod 2$ $x_2(n+31)=(x_2(n+3)+x_2(n+2)+x_2(n+1)+x_2(n))\mod 2$ where $N_c=1600$, and an initialization sequence of the first sequence $x_1(n)$ is $x_1(0)=1$, where $x_1(n)=0$, $n=1, 2, \ldots, 30$. An initialization sequence of the second sequence $x_2(n)$ can be represented as $c_{init}=\Sigma_{i=0}^{30} x_2(i) \times 2^i$, that is, $c_{init}$ represents the decimal value of the initialization sequence of the sequence $x_2(n)$. After the value of chit is determined, the initialization sequence of $x_2(n)$ can be obtained (the length of the initialization sequence is also 31), and then $x_2(n)$ can be determined; and then, by combining the same with the first sequence $x_1(n)$ (the length of the initialization sequence is equal to 31), the UE can determine the scrambling code sequence c(n). On the basis that tint is determined, the sequence $x_2(n)$ can be determined, and on the basis that the sequence $x_1(n)$ is given, the scrambling code sequence c(n) can be further determined;

$N_{symb}^{slot}$ represents the number of OFDM symbols included in one slot;

$n_{s,f}^\mu$ represents the slot number in a system frame.

Each embodiment of the present patent includes a method for determining the initialization sequence tint in the above function $n_{cs}(n_{s,f}^\mu, l)$. Accordingly, the cyclic shift of the PSFCH sequence is determined, and the PSFCH sequence is generated.

Basic Procedure of LTE V2X (Sidelink) Communication

Figure 1:
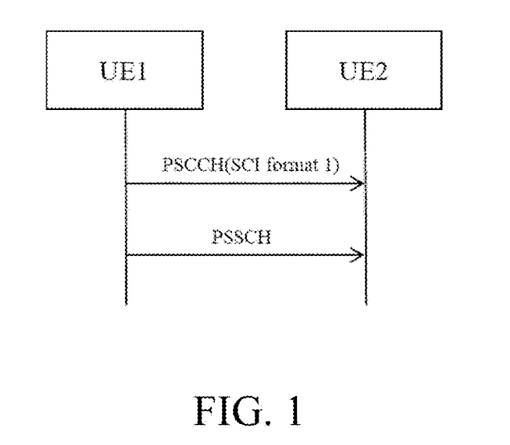
FIG. 1 is a basic procedure diagram schematically showing Rel-14/15 LTE V2X sidelink communication.

FIG. 1 is a schematic diagram showing sidelink communication of LTE V2X UE. First, UE1 transmits to UE2 sidelink control information (SCI format 1), which is carried by a physical layer channel PSCCH. SCI format 1 includes scheduling information of a PSSCH, such as frequency domain resources and the like of the PSSCH. Secondly, UE1 transmits to UE2 sidelink data, which is carried by the physical layer channel PSSCH. The PSCCH and the corresponding PSSCH are frequency division multiplexed, that is, the PSCCH and the corresponding PSSCH are located in the same subframe in the time domain but are located on different PRBs in the frequency domain. Specific design methods of the PSCCH and the PSSCH are as follows:

1) The PSCCH occupies one subframe in the time domain and two consecutive PRBs in the frequency domain. Initialization of a scrambling sequence uses a predefined value of 510. The PSCCH may carry SCI format 1, where SCI format 1 at least includes frequency domain resource information of the PSSCH. For example, for a frequency domain resource indication field, SCI format 1 indicates a starting subchannel number and the number of consecutive subchannels of the PSSCH corresponding to the PSCCH.

2) The PSSCH occupies one subframe in the time domain, and uses frequency division multiplexing (FDM) with the corresponding PSCCH. The PSSCH occupies one or a plurality of consecutive sub-channels in the frequency domain. The sub-channels represent $n_{subCHsize}$ consecutive PRBs in the frequency domain. $n_{subCHsize}$ is configured by an RRC parameter, and a starting sub-channel and the number of consecutive sub-channels are indicated by the frequency domain resource indication field of SCI format 1.

Resource Allocation Mode (Transmission Mode 3/4) of LTE V2X

Figure 2:
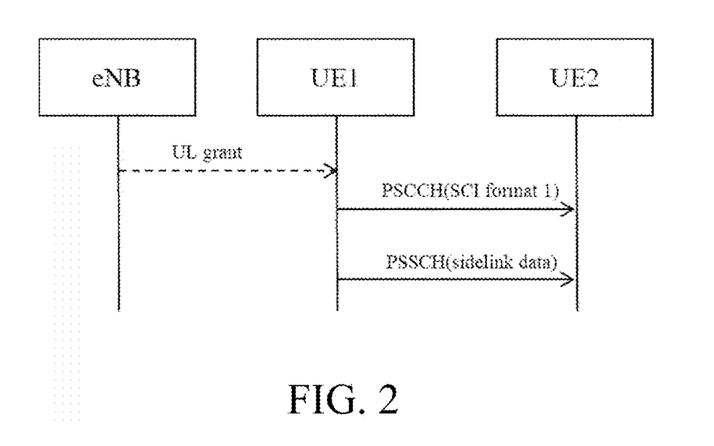
FIG. 2 schematically shows two resource allocation modes for Rel-14/15 LTE V2X.

FIG. 2 shows two resource allocation modes of LTE V2X, which are referred to as base station scheduling-based resource allocation (Transmission Mode 3) and UE sensing-based resource allocation (Transmission Mode 4), respectively. In LTE V2X, when there is eNB network coverage, a base station can configure, through UE-level dedicated RRC signaling SL-V2X-ConfigDedicated, a resource allocation mode of UE, or referred to as a transmission mode of the UE, which is specifically as follows:

1) Base station scheduling-based resource allocation mode (Transmission Mode 3): the base station scheduling-based resource allocation mode means that frequency domain resources used in sidelink communication are from scheduling of the base station. Transmission Mode 3 includes two scheduling modes, which are respectively dynamic scheduling and semi-persistent scheduling (SPS). For dynamic scheduling, a UL grant (DCI format 5A) includes the frequency domain resources of the PSSCH, and a CRC of a PDCCH or an EPDCCH carrying the DCI format 5A is scrambled by an SL-V-RNTI. For SPS, the base station configures one or a plurality of (at most 8) configured grants through IE: SPS-ConfigSL-r14, and each configured grant includes a grant index and a resource period of the grant. The UL grant (DCI format 5A) includes the frequency domain resource of the PSSCH, indication information (3 bits) of the grant index, and indication information of SPS activation or release (or deactivation). The CRC of the PDCCH or the EPDCCH carrying the DCI format 5A is scrambled by an SL-SPS-V-RNTI.

Specifically, when RRC signaling SL-V2X-ConfigDedicated is set to scheduled-r14, it indicates that the UE is configured in a base station scheduling-based transmission mode. The base station configures the SL-V-RNTI or the SL-SPS-V-RNTI via RRC signaling, and transmits the UL grant to the UE through the PDCCH or the EPDCCH (DCI format 5A, the CRC is scrambled by the SL-V-RNTI or the SL-SPS-V-RNTI). The UL grant includes at least scheduling information of the PSSCH frequency domain resource in sidelink communication. When the UE successfully detects the PDCCH or the EPDCCH scrambled by the SL-V-RNTI or the SL-SPS-V-RNTI, the UE uses a PSSCH frequency domain resource indication field in the UL grant (DCI format 5A) as PSSCH frequency domain resource indication information in a PSCCH (SCI format 1), and transmits the PSCCH (SCI format 1) and a corresponding PSSCH.

For SPS in Transmission Mode 3, the UE receives, on a downlink subframe n, the DCI format 5A scrambled by the SL-SPS-V-RNTI. If the DCI format 5A includes the indication information of SPS activation, then the UE determines frequency domain resources of the PSSCH according to the indication information in the DCI format 5A, and determines time domain resources of the PSSCH (transmission subframes of the PSSCH) according to information such as the subframe n and the like.

2) UE sensing-based resource allocation mode (Transmission Mode 4): The UE sensing-based resource allocation mode means that resources used for sidelink communication are based on a procedure of sensing a candidate available resource set by the UE. When the RRC signaling SL-V2X-ConfigDedicated is set to ue-Selected-r14, it indicates that the UE is configured to be in the UE sensing-based transmission mode. In the UE sensing-based transmission mode, the base station configures an available transmission resource pool, and the UE determines a PSSCH sidelink transmission resource in the transmission resource pool according to a certain rule (for a detailed description of the procedure, see the LTE V2X UE sensing procedure section), and transmits a PSCCH (SCI format 1) and a corresponding PSSCH.

Numerologies in NR (Including NR Sidelink) and Slots in NR (Including NR Sidelink)

A numerology includes two aspects: a subcarrier spacing and a cyclic prefix (CP) length. NR supports five subcarrier spacings, which are respectively 15 kHz, 30 kHz, 60 kHz, 120 kHz and 240 kHz (corresponding to $\mu$=0, 1, 2, 3, 4). Table 4.2-1 shows the supported transmission numerologies specifically as follows:

TABLE 4.2-1

| Subcarrier Spacings Supported by NR | | |
|---|---|---|
| $\mu$ | $\Delta f = 2^{\mu} \cdot 15$[kHz] | CP (cyclic prefix) |
| 0 | 15 | Normal |
| 1 | 30 | Normal |
| 2 | 60 | Normal, Extended |
| 3 | 120 | Normal |
| 4 | 240 | Normal |

Only when $\mu$=2, that is, in the case of a 60 kHz subcarrier spacing, an extended CP is supported, whereas only a normal CP is supported in the case of other subcarrier spacings. For a normal CP, each slot includes $N_{symb}^{slot}$=14 OFDM symbols; and for an extended CP, each slot includes $N_{symb}^{slot}$=12 OFDM symbols. For $\mu$=0, that is, a 15 kHz subcarrier spacing, one slot=1 ms; for $\mu$=1, that is, a 30 kHz subcarrier spacing, one slot=0.5 ms; for $\mu$=2, that is, a 60 kHz subcarrier spacing, one slot=0.25 ms, and so on.

NR and LTE have the same definition for a subframe, which denotes 1 ms. For a subcarrier spacing configuration $\mu$, a slot number in one subframe (1 ms) may be expressed as $n_s^{\mu}$, and ranges from 0 to $N_{slot}^{subframe,\mu}-1$. A slot number in one system frame (having a duration of 10 ms) may be expressed as $N_{s,f}^{\mu}$, and ranges from 0 to $N_{slot}^{frame,\mu}-1$. Definitions of $N_{slot}^{subframe,\mu}$ and $N_{slot}^{frame,\mu}$ for different subcarrier spacings $\mu$ are shown in the tables below.

TABLE 4.3.2-1 the number of symbols included in each slot, the number of slots included in each system frame, and the number of slots included in each subframe for the normal CP

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4.3.2-2 the number of symbols included in each slot, the number of slots included in each system frame, and the number of slots included in each subframe for the extended CP (60 kHz)

| μ | $N_{symb}^{slot}$ | $N_{slot}^{frame,\mu}$ | $N_{slot}^{subframe,\mu}$ |
|---|---|---|---|
| 2 | 12 | 40 | 4 |

On an NR carrier, a system frame (or simply referred to as frame) number (SFN) ranges from 0 to 1023. The concept of a direct frame number (DFN) is introduced to sidelink communication, and the number likewise ranges from 0 to 1023. The above description of the relationships between system frames and numerologies can likewise be applied to a direct frame. For example, a duration of one direct frame is likewise equal to 10 ms; for a subcarrier interval of 15 kHz, one direct frame includes 10 slots, and so on. The DFN is applied to timing on a sidelink carrier.

Sidelink Resource Pool

In sidelink communication, resources transmitted and received by UEs all belong to resource pools. For example, for a base station scheduling-based transmission mode in sidelink communication (Transmission Mode 1 in NR sidelink communication), the base station schedules transmission resources for a sidelink UE in a resource pool; alternatively, for a UE sensing-based transmission mode in sidelink communication (Transmission Mode 2 in NR sidelink communication), the UE determines a transmission resource in a resource pool.

CRC Calculation

Before CRC calculation, bits are represented as $a_0, a_1, a_{A-1}$ (a total of A bits). After CRC calculation, L parity bits (or referred to as an L-bit check code) are added behind $a_0, a_1, a_{A-1}$. The L parity bits are represented as $p_0, p_1, p_{L-1}$. The A+L bits can be expressed as a polynomial $a_0 D^{A+L-1} + a_1 D^{A+L-2} + \ldots + a_{A-1} D^L + p_0 D^{L-1} + p_1 D^{L-2} + \ldots + p_{L-1}$; that is, $a_0$ represents the highest bit, and $p_{L-1}$ represents the lowest bit. A CRC generator polynomial is (if L=24): $g_{CRC24A}(D) = D^{24} + D^{23} + D^{18} + D^{17} + D^{14} + D^{11} + D^{10} + D^7 + D^6 + D^5 + D^4 + D^3 + D + 1$, or $g_{CRC24B}(D) = D^{24} + D^{23} + D^6 + D^5 + D + 1$, or $g_{CRC24C}(D) = D^{24} + D^{23} + D^{21} + D^{20} + D^{17} + D^{15} + D^{13} + D^{12} + D^8 + D^4 + D^2 + D + 1$. $a_0 D^{A+L-1} a_1 D^{A+L-2} + \ldots + a_{A-1} D^L + p_0 D^{L-1} + p_1 D^{L-2} + \ldots + p_{L-1}$ obtained after CRC calculation is divisible by $g_{CRC24A}(D)$ or $g_{CRC24B}(D)$ or $g_{CRC24C}(D)$, that is, a remainder of $a_0 D^{A+L-1} + a_1 D^{A+L-2} + \ldots + a_{A-1} D^L + p_0 D^{L-1} + p_1 D^{L-2} + \ldots + p_{L-1}$ divided by $g_{CRC24A}(D)$ or $g_{CRC24B}(D)$ or $g_{CRC24C}(D)$ is 0 (L=24). The division used herein follows a calculation rule for a finite field, and binary operation employing only 0 and 1 is used. In addition, an exclusive OR operation (the same results in 0, and a difference results in 1) rule is used in the division; for example, a remainder of 100101 divided by 1110 is 1, and a remainder of 101100110100 divided by 11001 is 0.

Decimal Value (or Value) of Sequence

If it is assumed that a sequence has a length $L_s$ and can be represented as $s_0, s_1, \ldots, s_{L_s-1}$, then the decimal value of this sequence is equal to $\sum_{i=0}^{L_s-1} s_i \times 2^{L_s-1-i}$ or equal to $\sum_{i=0}^{L_s-1} s_i \times 2^i$ (respectively indicating that the highest bit of this sequence is $s_0$ and $s_{L_s-1}$; the present invention does not impose any limitation on the highest bit of the sequence, and the highest bit of the sequence may be $s_0$ and may also be $s_{L_s-1}$).

Sidelink Synchronization Signal Identity (SLSS ID)

In NR sidelink communication, a sidelink synchronization signal (SLSS) includes a primary sidelink synchronization signal (PSSS) and a secondary sidelink synchronization signal (SSSS).

In sidelink communication, the sidelink synchronization signal identity (SLSS) ID($N_i^{s}h$) has 672 values in total, and has a value range of 0 to 671, where $$N_{ID}^{SL} = N_{ID,1}^{SL} + 336 \times N_{ID,2}^{SL}$$

$N_{ID,1}^{SL} \in \{0, 1, \ldots, 335\}$, $N_{ID,2}^{SL} \in \{0, 1\}$. $N_{ID,2}^{SL}$ is carried by the primary sidelink synchronization signal (PSSS), and $N_{ID,1}^{SL}$ is carried by the secondary sidelink synchronization signal (SSSS).

For the received primary sidelink synchronization signal and secondary sidelink synchronization signal, the user equipment respectively determines $N_{ID,2}^{SL}$ and $N_{ID,1}^{SL}$ according to a sequence of the primary synchronization signal and a sequence of the secondary synchronization signal, so as to determine a sidelink synchronization signal identity (SLSS ID).

In NR sidelink communication, the user equipment may also transmit a primary synchronization signal PSSS and a secondary synchronization signal SSSS. That is, the user equipment uses the transmitted primary synchronization signal and secondary synchronization signal to carry the transmitted sidelink synchronization signal identity. It is worth pointing out that if the user equipment receives the primary synchronization signal and the secondary synchronization signal and acquires the sidelink synchronization signal identity (SLSS ID) (expressed as A) therefrom, when the user equipment transmits the primary synchronization signal and the secondary synchronization signal, a carried sidelink synchronization signal identity (SLSS ID) (expressed as B) may be equal to A, or may not be equal to A, for example, B=A, or B=A+336. The present invention does not impose any limitation on the numerical relationship between B and A.

In NR sidelink communication, a synchronization source provides the user equipment with sidelink transmission and reception timing. The above synchronization source includes a base station, a GNSS, and synchronization source UE (SyncRef UE). If the user equipment does not select a base station, a GNSS, or synchronization source UE, a synchronization source may not be selected. In the description of the present invention, the meaning represented by a sidelink synchronization signal identity corresponding to a synchronization source is as follows: if the synchronization source is a GNSS, then the sidelink synchronization signal identity corresponding to the synchronization source is 0 or another integer value, and if the synchronization source is synchronization source UE, then the sidelink synchronization signal identity corresponding to the synchronization source is a sidelink synchronization signal identity carried by a PSSS and an SSSS transmitted by the synchronization source UE. In the present invention, the sidelink synchronization signal identity corresponding to the synchronization source includes, but is not limited to, the above examples.

Embodiment 11

Figure 3:
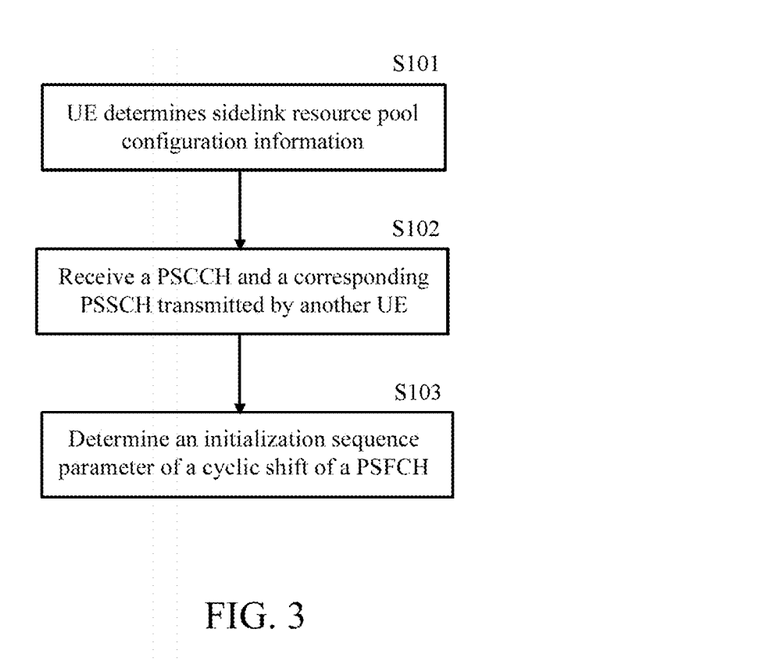
FIG. 3 is a basic flowchart schematically showing a method performed by user equipment according to Embodiments 1 and 2 of the present invention.

As shown in FIG. 3, in Embodiment 1 of the present invention, a method performed by user equipment may include:

In step S101, sidelink user equipment determines sidelink resource pool configuration information.

Optionally, the sidelink resource pool configuration information is configuration information transmitted by a base station through RRC signaling.

Alternatively,
optionally, the sidelink resource pool configuration information is sidelink pre-configured information/parameters.

Optionally, the sidelink resource pool configuration information is used to configure a PSFCH frequency hopping identity sl-PSFCH-HopID-r16 (that is, the PSFCH frequency hopping identity is present), or the sidelink resource pool configuration information is not used to configure the PSFCH frequency hopping identity sl-PSFCH-HopID-r16 (that is, the PSFCH frequency hopping identity is absent).

In step S102, the sidelink user equipment receives a PSCCH and a corresponding PSSCH transmitted by another user equipment.

Optionally, the user equipment determines a source ID and a destination ID according to first stage SCI carried by the PSCCH and/or second stage SCI carried by the PSSCH.

In step S103, the sidelink user equipment determines an initialization sequence parameter $c_{init}$ of a cyclic shift $\alpha_1$ of a sequence for a physical sidelink feedback channel (PSFCH).

Optionally, if the sidelink resource pool configuration information is used to configure the PSFCH frequency hopping identity sl-PSFCH-HopID-r16, then the sidelink user equipment determines that the initialization sequence parameter $c_{init}$ is equal to the value $n_{ID}$ of sl-PSFCH-HopID-r16; otherwise, the sidelink user equipment determines that the initialization sequence parameter $c_{init}$ is equal to the value $n_{ID}$, wherein $n_{ID}$ is equal to the source ID, or is equal to the destination ID, or is equal to a function value (expressed as f(source ID, and/or, destination ID)) regarding the source ID and/or the destination ID, or is equal to a remainder of the function value regarding the source ID and/or the destination ID divided by $2^{31}$ (expressed as {f(source ID, and/or destination ID)}mod $2^{31}$).

Embodiment 2

As shown in FIG. 3, in Embodiment 2 of the present invention, a method performed by user equipment may include:

In step S101, sidelink user equipment determines sidelink resource pool configuration information.

Optionally, the sidelink resource pool configuration information is configuration information transmitted by a base station through RRC signaling.

Alternatively,
optionally, the sidelink resource pool configuration information is sidelink pre-configured information/parameters.

Optionally, the sidelink resource pool configuration information is used to configure a PSFCH frequency hopping identity sl-PSFCH-HopID-r16 (that is, the PSFCH frequency hopping identity is present), or the sidelink resource pool configuration information is not used to configure the PSFCH frequency hopping identity sl-PSFCH-HopID-r16 (that is, the PSFCH frequency hopping identity is absent).

In step S102, the sidelink user equipment receives a PSCCH and a corresponding PSSCH transmitted by another user equipment.

Optionally, the user equipment determines that the value $n_{CRC}$ of a CRC check code (or part of the CRC check code) of the first stage SCI carried by the PSCCH is equal to $\sum_{i=0}^{L-1} p_i \times 2^{L-1-i}$ or $\sum_{i=0}^{L-1} p_i \times 2^i$ or $\sum_{i=A}^{B} p_i \times 2^{B-i}$ or $\sum_{i=A}^{B} p_i \times 2^{i-A}$, where L represents the number of bits of the CRC check code ($p_0, p_1, \ldots, p_{L-1}$) of the first stage SCI, and satisfies $0 \leq A \leq B \leq L-1$.

Optionally, the user equipment determines that the value $n_{CRC}$ of a CRC check code (or part of the CRC check code) of the second stage SCI carried by the PSSCH is equal to $\sum_{i=0}^{L-1} p_i \times 2^{L-1-i}$ or $\sum_{i=0}^{L-1} p_i \times 2^i$ or $\sum_{i=A}^{B} p_i \times 2^{B-i}$ or $\sum_{i=A}^{B} p_i \times 2^{i-A}$ where L represents the number of bits of the CRC check code ($p_0, p_1, \ldots, p_{L-1}$) of the second stage SCI, and satisfies $0 \leq A \leq B \leq L-1$.

In step S103, the sidelink user equipment determines an initialization sequence parameter $c_{init}$ of a cyclic shift $\alpha_1$ of a sequence for a physical sidelink feedback channel (PSFCH).

Optionally, if the sidelink resource pool configuration information is used to configure the PSFCH frequency hopping identity sl-PSFCH-HopID-r16, then the sidelink user equipment determines that the initialization sequence parameter tint is equal to the value $n_{ID}$ of sl-PSFCH-HopID-r16; otherwise, the sidelink user equipment determines that the initialization sequence parameter $c_{init}$ is equal to $n_{CRC}$, or is equal to a function value (expressed as f($n_{CRC}$)) regarding $n_{CRC}$, or is equal to a remainder of the function value regarding $n_{CRC}$ divided by $2^{31}$ (expressed as {f($n_{CRC}$)}mod $2^{31}$).

Embodiment 3

Figure 4:
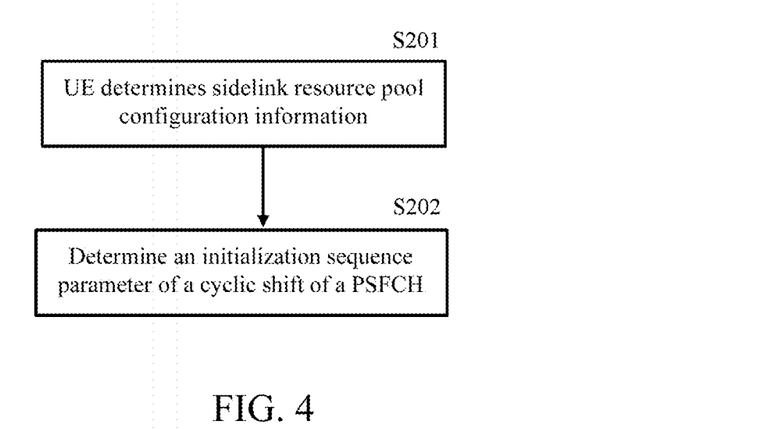
FIG. 4 is a basic flowchart schematically showing a method performed by user equipment according to Embodiments 3 and 4 of the present invention.

As shown in FIG. 4, in Embodiment 3 of the present invention, a method performed by user equipment may include:

In step S201, sidelink user equipment determines sidelink resource pool configuration information.

Optionally, the sidelink resource pool configuration information is configuration information transmitted by a base station through RRC signaling.

Alternatively, optionally, the sidelink resource pool configuration information is sidelink pre-configured information/parameters.

Optionally, the sidelink resource pool configuration information is used to configure a PSFCH frequency hopping identity sl-PSFCH-HopID-r16 (that is, the PSFCH frequency hopping identity is present), or the sidelink resource pool configuration information is not used to configure the PSFCH frequency hopping identity sl-PSFCH-HopID-r16 (that is, the PSFCH frequency hopping identity is absent).

In step S202, the sidelink user equipment determines an initialization sequence parameter $c_{init}$ of a cyclic shift $\alpha_1$ of a sequence for a physical sidelink feedback channel (PSFCH).

Optionally, if the sidelink resource pool configuration information is used to configure the PSFCH frequency hopping identity sl-PSFCH-HopID-r16, then the sidelink user equipment determines that the initialization sequence parameter $c_{init}$ is equal to the value $n_{ID}$ of sl-PSFCH-HopID-r16; otherwise, the sidelink user equipment determines that the initialization sequence parameter $c_{init}$ is equal to a sidelink synchronization signal identity (SLSS ID). Optionally, the sidelink synchronization signal identity represents a sidelink synchronization signal identity corresponding to a synchronization source of the user equipment, and is optionally 0 (or any integer from 0 to 671). Alternatively, optionally, the sidelink synchronization signal identity represents a sidelink synchronization signal identity carried by a transmitted sidelink synchronization signal (transmission of SLSS) determined by the user equipment according to a selected synchronization source (a base station, or a GNSS, or synchronization source UE, or non-synchronization source UE).

Embodiment 4

As shown in FIG. 4, in Embodiment 4 of the present invention, a method performed by user equipment may include:

In step S201, sidelink user equipment determines sidelink resource pool configuration information.

Optionally, the sidelink resource pool configuration information is configuration information transmitted by a base station through RRC signaling.

Alternatively, optionally, the sidelink resource pool configuration information is sidelink pre-configured information/parameters.

Optionally, the sidelink resource pool configuration information is used to configure a PSFCH frequency hopping identity sl-PSFCH-HopID-r16 (that is, the PSFCH frequency hopping identity is present), or the sidelink resource pool configuration information is not used to configure the PSFCH frequency hopping identity sl-PSFCH-HopID-r16 (that is, the PSFCH frequency hopping identity is absent).

In step S202, the sidelink user equipment determines an initialization sequence parameter $c_{init}$ of a cyclic shift $\alpha_1$ of a sequence for a physical sidelink feedback channel (PSFCH).

Optionally, if the sidelink resource pool configuration information is used to configure the PSFCH frequency hopping identity sl-PSFCH-HopID-r16, then the sidelink user equipment determines that the initialization sequence parameter $c_{init}$ is equal to the value $n_{ID}$ of sl-PSFCH-HopID-r16; otherwise, if, optionally, (on the sidelink frequency) the user equipment is in-coverage (or, has a serving cell), then the sidelink user equipment determines that the initialization sequence parameter $c_{init}$ is equal to a cell identity $N_{ID}^{cell}$ of the serving cell or a corresponding cell providing coverage; otherwise, optionally, the sidelink user equipment determines that the initialization sequence parameter $c_{init}$ is equal to a sidelink synchronization signal identity (SLSS ID). Optionally, the sidelink synchronization signal identity represents a sidelink synchronization signal identity corresponding to a synchronization source of the user equipment, and is optionally 0 (or any integer from 0 to 671). Alternatively, optionally, the sidelink synchronization signal identity represents a sidelink synchronization signal identity carried by a transmitted sidelink synchronization signal (transmission of SLSS) determined by the user equipment according to a selected synchronization source (a base station, or a GNSS, or synchronization source UE, or non-synchronization source UE).

Figure 5:
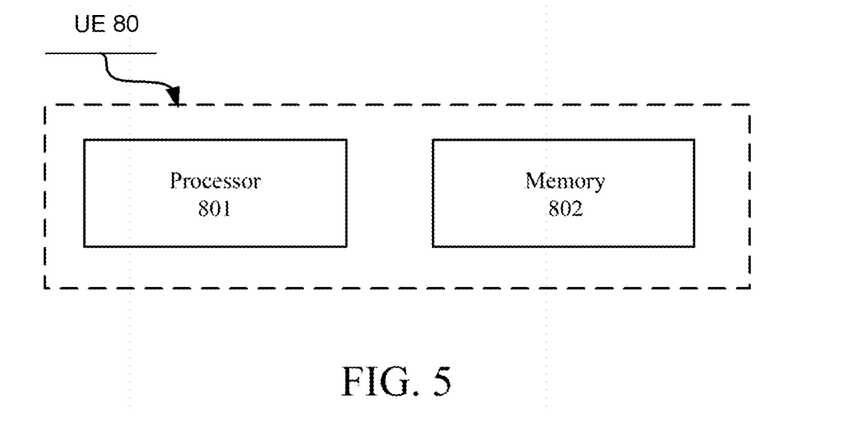
FIG. 5 is a block diagram schematically showing the user equipment according to the present disclosure.

FIG. 5 is a block diagram showing the user equipment (UE) according to the present disclosure. As shown in FIG. 5, the user equipment (UE) 80 includes a processor 801 and a memory 802. The processor 801 may include, for example, a microprocessor, a microcontroller, an embedded processor, and the like. The memory 802 may include, for example, a volatile memory (such as a random access memory (RAM)), a hard disk drive (HDD), a non-volatile memory (such as a flash memory), or other memories. The memory 802 stores program instructions. The instructions, when run by the processor 801, can perform the above method performed by user equipment described in detail in the present disclosure.

The methods and related devices according to the present disclosure have been described above in conjunction with preferred embodiments. It should be understood by those skilled in the art that the methods shown above are only exemplary, and the above embodiments can be combined with one another as long as no contradiction arises. The method according to the present disclosure is not limited to steps or sequences shown above. The network node and user equipment illustrated above may include more modules. For example, the network node and user equipment may further include modules that can be developed or will be developed in the future to be applied to a base station, an MME, or UE, and the like. Various identifiers shown above are only exemplary, not for limitation, and the present disclosure is not limited to specific information elements serving as examples of these identifiers. A person skilled in the art could make various alterations and modifications according to the teachings of the illustrated embodiments.

It should be understood that the above embodiments of the present disclosure may be implemented through software, hardware, or a combination of software and hardware. For example, various components inside the base station and the user equipment in the above embodiments may be implemented through various devices, which include, but are not limited to, analog circuit devices, digital circuit devices, digital signal processing (DSP) circuits, programmable processors, application specific integrated circuits (ASICs), field programmable gate arrays (FPGAs), programmable logic devices (CPLDs), and the like.

In this application, the "base station" may refer to a mobile communication data and control exchange center with large transmission power and a wide coverage area, including functions such as resource allocation and scheduling, data reception and transmission. "User equipment" may refer to a user mobile terminal, for example, including terminal devices that can communicate with a base station or a micro base station wirelessly, such as a mobile phone, a laptop computer, and the like.

In addition, the embodiments of the present disclosure disclosed herein may be implemented on a computer program product. More specifically, the computer program product is a product provided with a computer-readable medium having computer program logic encoded thereon. When being executed on a computing device, the computer program logic provides related operations to implement the above-described technical solutions of the present disclosure. When being executed on at least one processor of a computing system, the computer program logic enables the processor to perform the operations (methods) described in the embodiments of the present disclosure. Such an arrangement of the present disclosure is typically provided as software, code, and/or other data structures that are configured or encoded on a computer-readable medium, such as an optical medium (for example, a CD-ROM), a floppy disk, or a hard disk, or other media such as firmware or microcode on one or more ROM or RAM or PROM chips, or downloadable software images, shared database and so on in one or more modules. Software or firmware or such configuration may be installed on a computing equipment such that one or more processors in the computing equipment perform the technical solutions described in the embodiments of the present disclosure.

In addition, each functional module or each feature of the base station device and the terminal device used in each of the above embodiments may be implemented or executed by a circuit, which is usually one or more integrated circuits. Circuits designed to execute various functions described in this description may include general-purpose processors, digital signal processors (DSPs), application specific integrated circuits (ASICs) or general-purpose integrated circuits, field programmable gate arrays (FPGAs) or other programmable logic devices, discrete gates or transistor logic, or discrete hardware components, or any combination of the above. The general purpose processor may be a microprocessor, or the processor may be an existing processor, a controller, a microcontroller, or a state machine. The above-mentioned general-purpose processor or each circuit may be configured with a digital circuit, or may be configured with a logic circuit. In addition, when an advanced technology that can replace current integrated circuits emerges because of advances in semiconductor technology, the present disclosure may also use integrated circuits obtained using this advanced technology.

Although the present disclosure has been shown in connection with the preferred embodiments disclosed herein, it will be understood by those skilled in the art that various modifications, substitutions, and alterations may be made therein without departing from the spirit and scope of the present disclosure. Accordingly, the present disclosure should not be defined by the above-described embodiments, but should be defined by the appended claims and their equivalents.

The invention claimed is:

1. A method performed by user equipment, comprising:
transmitting a physical sidelink feedback channel (PSFCH), wherein the PSFCH is used for carrying sidelink HARQ-ACK, and
generating a cyclic shift $\alpha_1$ of a sequence for the PSFCH based on a value of an initialization sequence parameter $c_{init}$, wherein
the cyclic shift $\alpha_1$ is generated based on a sequence initialized with the value of the initialization sequence parameter $c_{init}$,
the value of the initialization sequence parameter $c_{init}$ is equal to a value of a PSFCH hopping identification if configured; and
if the value of the PSFCH hopping identification is not configured, the value of the initialization sequence parameter $c_{init}$ is 0.

2. User equipment, comprising:
transmission circuitry configured to transmit a physical sidelink feedback channel (PSFCH), wherein the PSFCH is used for carrying sidelink HARQ-ACK, and
processing circuitry configured to generate a cyclic shift $\alpha_1$ of a sequence for the PSFCH based on a value of an initialization sequence parameter $c_{init}$, wherein
the cyclic shift $\alpha_1$ is generated based on a sequence initialized with the value of the initialization sequence parameter $c_{init}$,
the value of the initialization sequence parameter $c_{init}$ is equal to a value of a PSFCH hopping identification if configured; and
if the value of the PSFCH hopping identification is not configured, the value of the initialization sequence parameter $c_{init}$ is 0.

* * * * *